United States Patent [19]

Kwon

[11] Patent Number: 5,063,593
[45] Date of Patent: Nov. 5, 1991

[54] TONE-TYPE RECOGNITION METHOD

[75] Inventor: Oh-Seol Kwon, Seoul, Rep. of Korea

[73] Assignee: SamSung Electronics Co., Ltd., Suweon, Rep. of Korea

[21] Appl. No.: 397,254

[22] Filed: Aug. 23, 1989

[51] Int. Cl.$^5$ ............................................. H04M 1/00
[52] U.S. Cl. .................................... 379/386; 379/372; 379/377
[58] Field of Search ............... 379/372, 377, 381, 382, 379/386

[56] References Cited

U.S. PATENT DOCUMENTS

| | | | |
|---|---|---|---|
| 3,270,143 | 8/1966 | Germond et al. | 379/386 |
| 4,405,833 | 9/1983 | Cave et al. | 379/372 |
| 4,439,639 | 3/1984 | Munter | 379/386 |
| 4,528,664 | 7/1985 | Cheng et al. | 379/381 |
| 4,686,699 | 8/1987 | Wilkie | 379/386 |
| 4,696,031 | 9/1987 | Freudberg et al. | 379/386 |

Primary Examiner—Jin F. Ng
Assistant Examiner—Jhancy Augustus
Attorney, Agent, or Firm—Robert E. Bushnell

[57] ABSTRACT

There is disclosed a tone type recognition method capable of recognizing a call progress state of a central office line switching system by using a tone detector. The method enables the system to correctly recognize the type of call progress tone, regardless of its frequency, by conducting periodic detection of characteristics of cadence classified by tone-type.

14 Claims, 6 Drawing Sheets

| TONE-TYPE | FREQUENCY(HZ) | CADENCE |
|---|---|---|
| Dial Tone | 350+440 | CONTINUATION |
| Busy Tone | 480+620 | 0.5Sec ON, 0.5Sec ON |
| Reordor Tone | 480+620 | 0.3sec ON, 0.2sec ON |
| Ring Back Tone | 440+480 | 1Sec ON, 1 Sec ON |

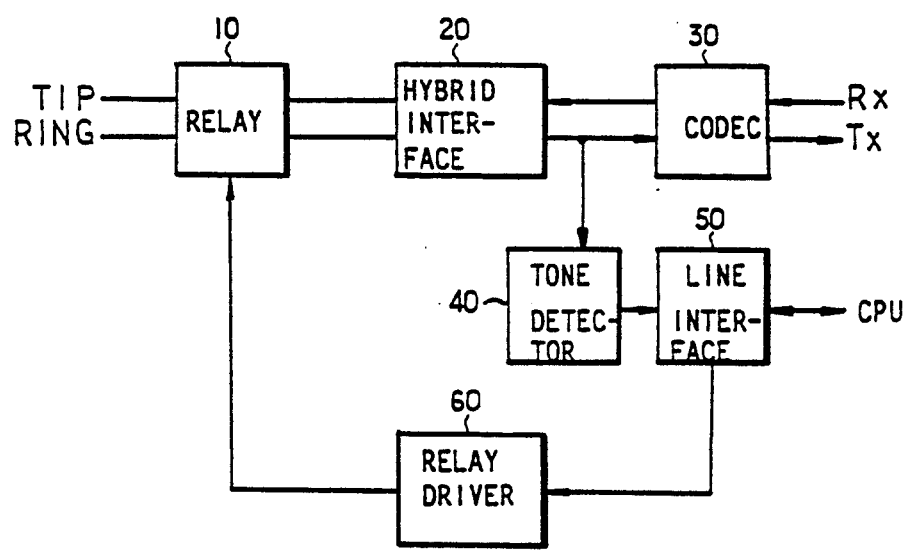
Fig. 5
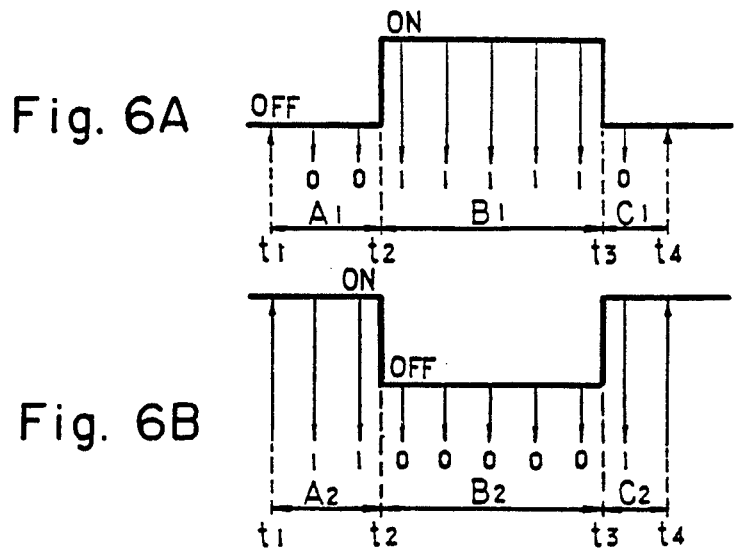
Fig. 6A
Fig. 6B

TONE-TYPE RECOGNITION METHOD

BACKGROUND OF THE INVENTION

The present invention relates to a tone type recognition method and, more particularly, to a method that can recognize a call progress state of a central office line (hereinafter referred to as C.O.L.) switching system by using a tone detector.

The function of recognizing the call progress state of the C.O.L. switching system in various communication devices (PBX, facsimile, modem etc.) that are linked with C.O.L. is important in such aspects of effectively using communication lines and serving subscribers.

To achieve the above object, in a conventional method, relatively expensive integrated circuit chips are employed that recognize respective frequencies by way of hardware manipulating a characteristic that representative call progress tones differ in frequency by their tone types. Accordingly, the prior method is accompanied with a cost-rise factor and has such a disadvantage in that tones with the same frequencies (for example, busy tone and reorder tone) are impossible to distinguish.

SUMMARY OF THE INVENTION

Therefore, an object of the present invention is to provide a method that can correctly recognize the type of call progress tone, regardless of its frequency, by conducting periodic detection of characteristics of cadence classified by tone-type.

According to one aspect of the invention, the inventive method including the steps of: reading an initial tone type from a tone detector at a time when a tone-read operation request is made and specifying "tone-off" wait state if the tone is in an "on" state at the time or "tone-on" wait state if it is in an "off" state at the time; and reading tone state from the tone detector periodically within a specified interval, and based on a wait state specified in the step, counting the number of "tone-on" states if "tone-on" wait was the specified state or counting the number of "tone-off" states if "tone-off" wait was the specified state, and then identifying tone-type according to the result of the count.

BRIEF DESCRIPTION OF THE ATTACHED DRAWINGS

For a better understanding of the invention and to show how the same might be carried into effect, reference will now be made, by way of example, to the accompanying diagrammatic drawings, in which:

FIG. 5 is a block diagram of a C.O.L. connection according to the present invention; and FIGS. 6A and 6B are a diagram of tone-read timing in case of a busy tone.

DETAILED DESCRIPTION OF THE INVENTION

A preferred embodiment of the invention will now be explained in detail, with reference to the accompanying drawings, only by way of example.

Figures 1, 2:
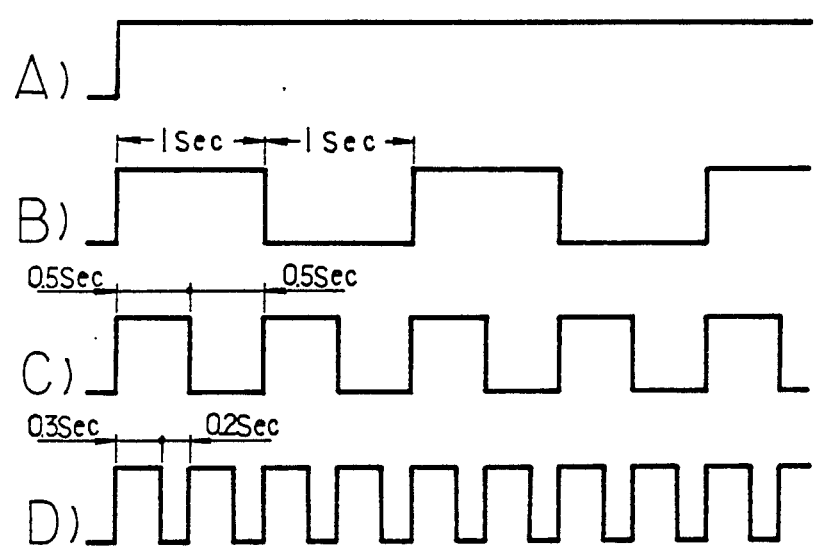
FIG. 1 is an examplary diagram of composition of general tone types in a C.O.L. switching system.
FIG. 2 is a diagram of cadence timings classified by tone types.

FIG. 1 is a composition diagram illustrating frequencies and cadence by representative tone-types caused by call progress state in the C.O.L. switching system, and herein, service states of line connection with C.O.L. is distinguished by differentiating synthetic frequencies and cadences by tone-types as shown in the diagram.

FIG. 2 is a diagram of cadence timings by tone-types according to examples in FIG. 1. In the diagram, a dial tone A indicates continued generation of a synthetic frequency of 350+440 Hz, a ring back tone B indicates generation of a synthetic frequency of 440+480 Hz by on/off in 1 second/1 second interval, a busy tone C indicates generation of a synthetic frequency of 480+620 Hz by on/off in 0.5 second/0.5 second interval, a reorder tone D indicates generation of a synthetic frequency of 480+620 Hz by on/off in 0.3 second/0.2 second interval.

On the other hand, FIG. 5 is a block diagram of C.O.L. interfacing section applied to the present invention, in which there is a relay 10 for connecting the lines of C.O.L. switching system. A relay driver 60 then operates the relay 10. Besides, a hybrid interface section 20 sends received signals to a subscriber through a line in accordance with on/off operation of the relay 10. A codec 30 converts analog voice signals into digital signals. Thereafter, a tone detector 40 checks for tones in signal output from the hybrid interface section 20, and produces output of logic "1" if there is a tone (ie., "on" state), and output of logic "0" if there is no tone (ie., "off" state). Further, a line interface 50 includes the tone detector 40, relay driver 60 and a micro-processor (not shown in the drawing).

The variety of tones described in FIG. 1 are applied to the hybrid interface section 20 through the relay 10 in response to the service progress state in the C.O.L. that is not shown in the drawing, whether or not there is a tone is checked by the tone detector 40 and is fed through the line interface 50 to the micro-processor that is not shown in the drawing, and then the program, which performs the present invention for detecting tone types, is executed.

Figure 3:
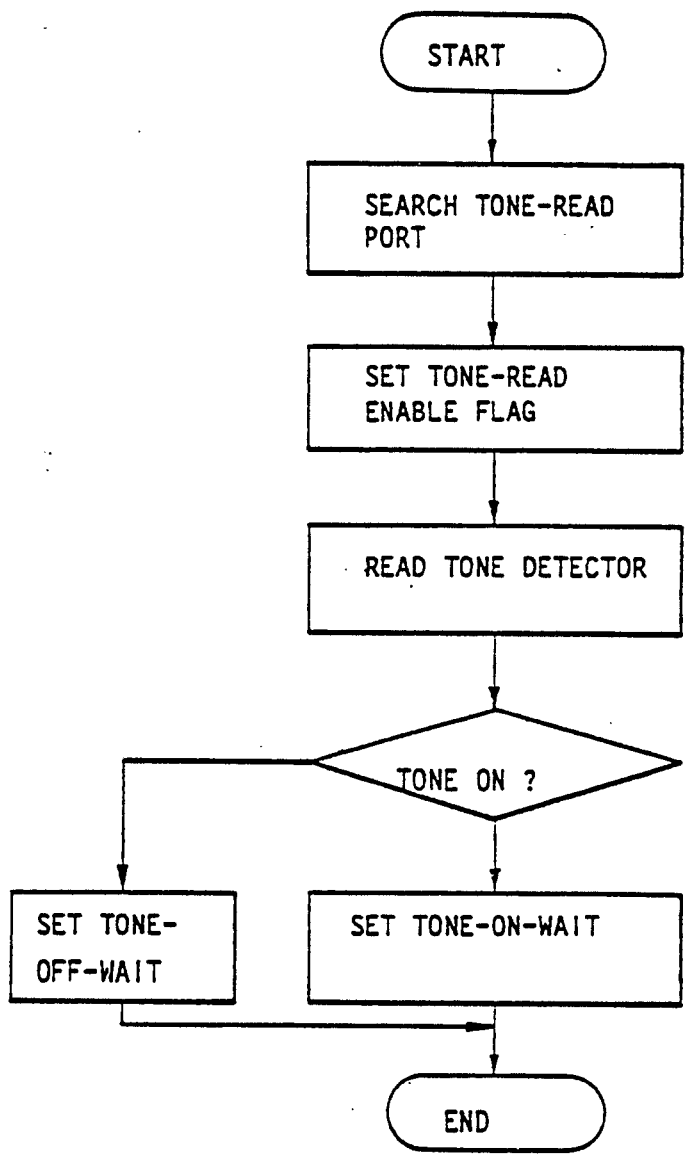
FIG. 3 is a flow diagram of a non-periodic tone-read operation according to the present invention.

FIG. 6 is an embodiment of a tone-read timing operation with one hundred milli-seconds interrupt intervals for tone-type recognition applied to the busy tone-type of FIG. 1; herein, operational relations of the present invention are described with flow charts of FIG. 3, 4 which are programs according to the invention.

Operation is performed with a timing as shown in A of FIG. 6 if current tone is in the "off" state at the time (t1) when a tone-read operation is requested, types of tones are determined by identifying how many times "1" is read by reading the tone detector 40 every 100 m seconds during the period B1 between time t2, at which a concerned tone is switched from "off" to "on", and time t3 at which the tone is switched back from "on" to "off".

That is, the tone detector is continually read every 100 m seconds until the logic "1" is read because the tone is in "off" state at the time when the tone-read operation is requested. If "0" is read continuously, A1 state is sustained, but if "1" is read at the tone detector at a certain time, the state is changed into B1 state and, from this point, "1" is accumulated every 100 m seconds until the tone is turned into "off" state.

If the tone is in "off" state, the state is shifted into C1 so that the tone-type can be determined, periodic detection is stopped and tone type is determined by the number of "1" accumulated in the B1 state.

On the contrary, if the tone-read operation is requested at the time when the tone is in the state of "on", operation is performed with timing as shown in B of FIG. 6, so that the entire operation is performed in a manner contrary to the above case. Therefore, the tone-type is determined by the number of "0" accumulated in the B2 state. That is, waiting is continued in the interval A2 in which the tone is in "on" state until the tone is turned into "off" state, and number of "0", which are read by the tone detector 40 in the interval B2 which exists between tone "off" point t2 and tone "on" point t3, are accumulated in the B2 interval, and the tone-type is determined in the interval C2, where the tone is shifted into "on" state again, by the number of "0" accumulated in the interval B2. In consequence, it is clear that a busy tone is determined by the accumulated number of either "0" in the drawing A or "1" in the drawing B of FIG. 6.

Figure 4A:
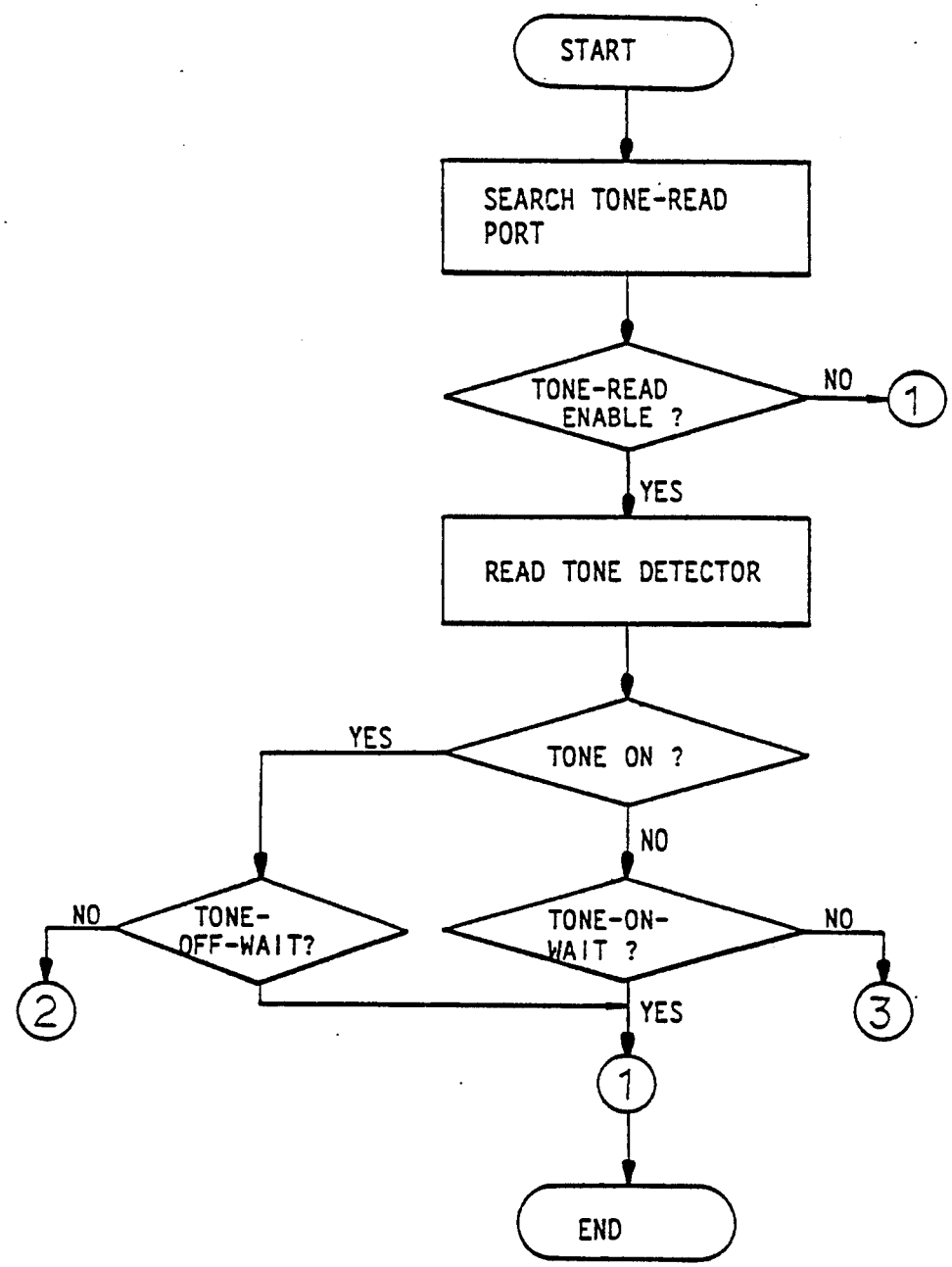
FIGS. 4A, 4B and 4C are a flow diagram of a periodic tone-read operation according to the present invention.
Figure 4B:
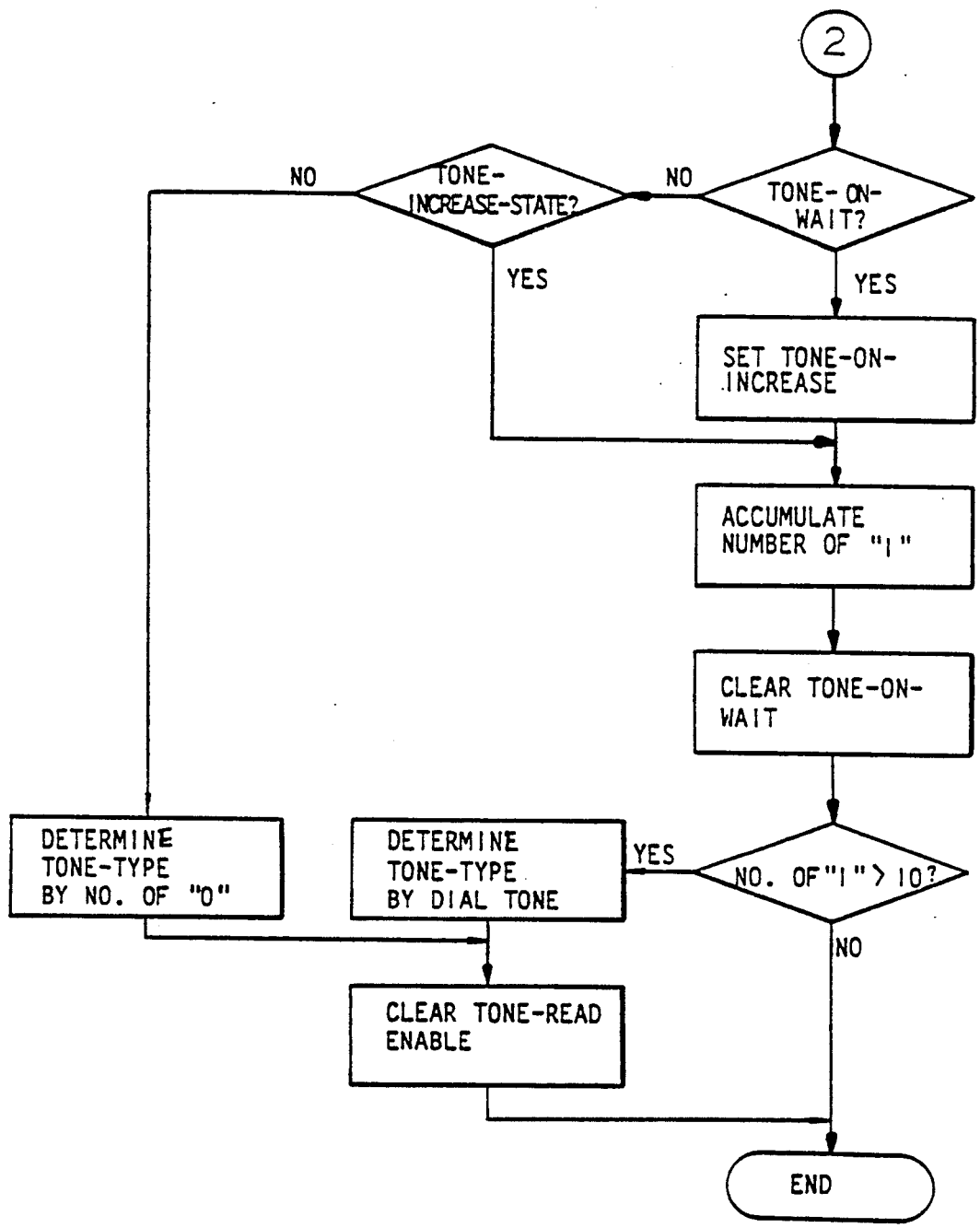
Figure 4C:
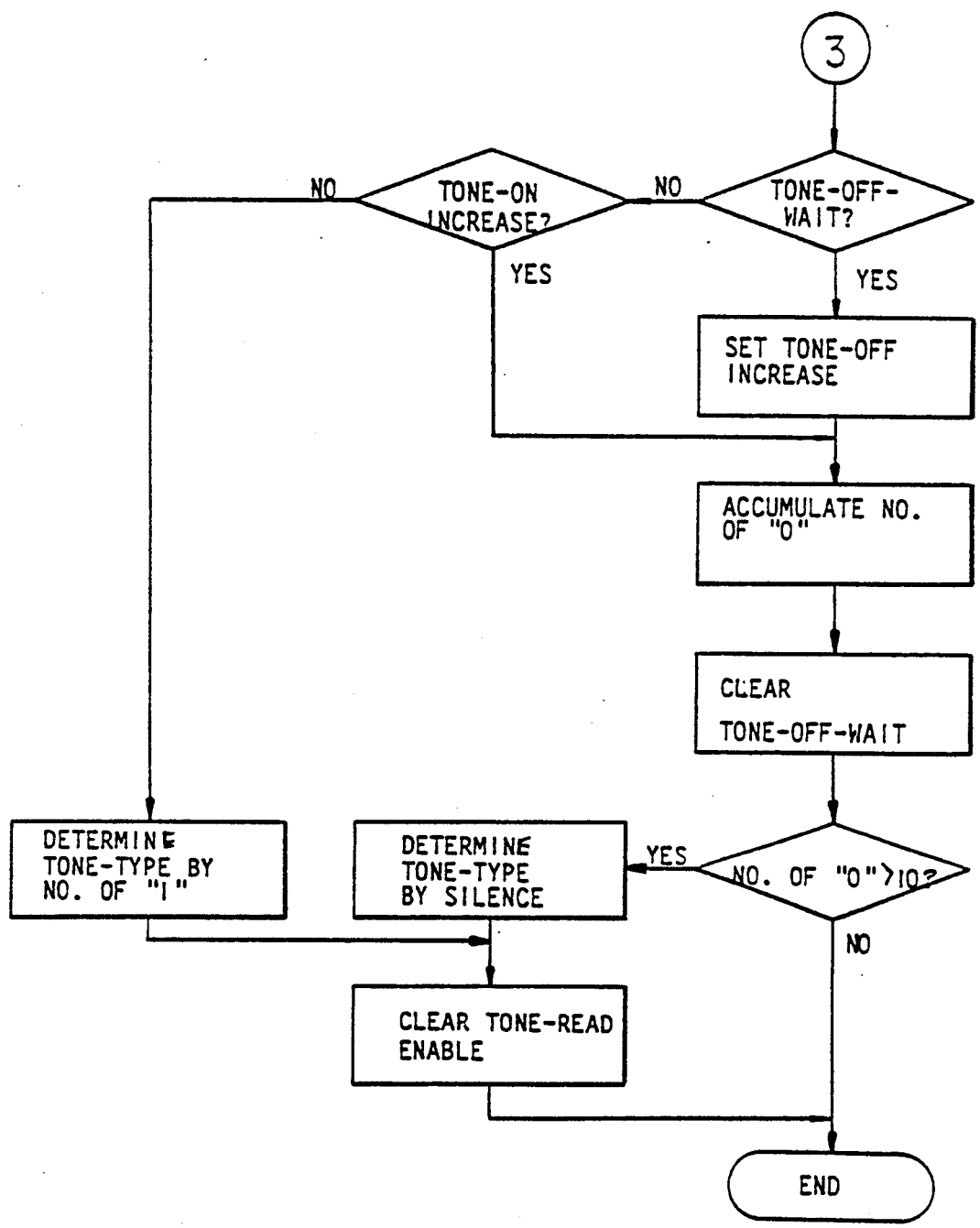

In the present invention, non-periodic tone-read operation of FIG. 3 is an illustration of a method that specifies "tone-off-wait state" or "tone-on-wait state" by checking whether or not there is a first tone at the time of the first tone-read request. Periodic tone-read operation of FIG. 4 is an illustration of a method that determines tone-type by continually performing a tone detection every one hundred milli-seconds.

Therefore, flows of tone-read operations of FIG. 3, 4 has an explanation that, in a non-periodic tone-read program, first a port where a tone-read operation has to be performed is searched and, in a periodic tone-read program performed in every one hundred milli-seconds, an enable flag is set to read tones. Accordingly, in the periodic tone-read program, tone-read operation can be performed only for a port for which tone-read enable flag is set.

For example, if a state of tone "on" is started at a read of a first tone, the "tone-off-wait" flag is set in order to perform counting to identify tone type from the time when the tone is shifted to "off". In addition, if a tone starts with "off" state, the "tone-on-wait" flag is set in order to perform counting to identify tone-type from the time when the tone is shifted to "on".

Next, in the periodic tone-read program which operates every one hundred milli-seconds, after a port for which tone-read operation is to be performed is determined, the corresponding service is performed only for a port for which a tone-read enable flag is set. That is, if "on" or "off" state is read for a first tone and current tone, operation is ended and the periodic program is performed again with one hundred milli-seconds interval from the very beginning.

If the first state of a tone was "off" and a current tone is shifted to "on", an accumulation operation to read tone type is started; that is, a "tone-on increase" flag is set to accumulate the number of "1's" which means "on" state of tone so that the number of "1's" is accumulated and the "tone-on-state" flag is cleared off.

Thereafter, if the accumulated number of "1's" exceeds a number ten, it means that tone "on" time has reached one second, so that the tone-type is identified as a dial tone as shown in the FIG. 1, 2, but if the number does not exceed the number ten, then the tone-type is determined by the number of accumulated "1's".

Similarly, if the first state of a tone was "on" and the current tone is shifted to "off", a "tone-on-increase" flag is set and subsequent number of "0's" are accumulated by tone-read operation with 100 m seconds interval, and the tone is identified as a silence tone if the accumulated number of "0's" exceeds ten, but if not exceeds ten, then tone type is determined by the number of accumulated "0's".

In the illustrations of the present invention so far, the embodiment which employs the detection with one hundred milli-seconds interval as a necessary and sufficient condition, has been exemplified to recognize only the general tone-type described in FIG. 1. However, it is evident that tone-type can be identified simply by differentiating criterion of determining the tone-types according to the number of accumulated "1's" or "0's" read by the tone detector with interrupt intervals of one hundred milli-seconds even if there are far more cadences by tone types.

As described above, the inventive method presents such advantages that cost factor is lowered by adopting a tone detector which is cheap in price but still can recognize tone types by reading only whether or not there is a tone, and tone types are effectively recognized even for the tones which are represented by identical synthetic frequencies.

While the invention has been particularly shown and described with reference to a preferred embodiment, it will be understood by those skilled in the art that modifications in detail may be made without departing from the spirit and scope of the invention.

What is claimed is:

1. A tone-type recognition method in a switching system, said method comprising the steps of:
   reading an initial tone type from a tone detector upon receipt of a request for a tone-read operation and specifying a "tone-off" wait state if the tone type is determined to be in an "on" state upon receipt of the request or a "tone-on" wait state if the tone type is determined to be in an "off" state upon receipt of the request; and
   reading the tone state from the tone detector periodically based on the wait state specified in said step of specifying, counting a number of "tone-on" states if the "tone-on" wait state is the specified state or counting a number of "tone-off" wait states if the "tone-off" wait state is the specified state, and identifying tone-type according to said count.

2. A method as claimed in claim 1, wherein said step of periodically reading the tone state is performed in intervals of about one hundred milliseconds.

3. A method as claimed in claim 1, further comprised of identifying said tone-type as a dial tone when said count of "1" has a value greater than ten.

4. A method as claimed in claim 1, further comprised of identifying said tone-type as a silence tone when said count of "0" has a value greater than ten.

5. A method as claimed in claim 1, further comprised of identifying said tone-type as a busy tone when said count of "0" or said count of "1" has a value equal to ten.

6. A method as claimed in claim 1, further comprised of identifying said tone-type as a ring back tone when said count of "0" or said count of "1" has a value equal to five.

7. A tone type recognition system for a central office line switching system, comprising:
- a relay for connecting said recognition system to said central office line switching system;
- a relay driver for driving said relay;
- a hybrid interface receiving first signals from said relay for sending to a subscriber based on operation of the relay;
- a tone detector for checking tones in signals received from said hybrid interface, for producing a second signal of high logic level if a tone is detected, and for producing a third signal of low logic level if no tone is detected;
- a line interface for delivering said second or third signals from said tone detector to a microprocessor; and
- a codec for converting analog voice signals received from said hybrid interface into digital signals.

8. The tone type recognition system of claim 7, further comprised of said line interface controlling operation of said relay driver.

9. The tone type recognition system of claim 7, further comprised of:
- said relay driver driving said relay between ON and OFF states;
- said hybrid interface sending said first signals to the subscriber in accordance with said ON and OFF states of said relay driver; and
- said line interface beomg coupled to said relay driver.

10. The tone type recognition system of claim 7, further comprised of:
- said relay applying a plurality of tones representing service progress states to said hybrid interface section;
- said relay driver driving said relay between ON and OFF states;
- said hybrid interface sending said first signals to the subscriber in accordance with said ON and OFF states of said relay driver; and
- said line interface being coupled to apply signals to said relay driver.

11. A non-periodic tone-type recognition method for determining the existence of a tone in a switching system, said method comprising the steps of:
- setting a tone-read enable flag for a port;
- checking if a tone is present at said port;
- setting a "tone-off-wait" state if no tone is present at said port; and
- setting a "tone-on-wait" state if a tone is present at said port.

12. A periodic tone-type recognition method in a switching system, said method comprising the steps of:
- checking if a tone-read enable flag is set at a port;
- stopping the search if the tone-read enable flag is not set for said port;
- checking for the presence of a tone at said port if the tone-read enable flag is set;
- performing a "tone-off-wait" state function if a tone is present at said port; and
- performing a "tone-on-wait" state function if no tone is present at said port.

13. A method as claimed in claim 12, wherein said "tone-off-wait" function comprises the steps of:
- checking for the presence of a "tone-off-wait" state;
- checking for the presence of a "tone-on-wait" state if no "tone-off-wait" state is present;
- setting a tone-on increase state during the presence of a "tone-on-wait" state;
- checking if a tone-off-increase state is set when no "tone-on-wait" state is present;
- counting a number of "1" upon detection of a tone-on-increase state or tone-off-increase state;
- clearing the tone-on-wait state;
- checking if the count of "1" is greater than 10; determining the tone-type to be a dial tone if the count of the number of "1" is greater than 10;
- determining the tone-type by a number of "0" counted if the tone-on-increase state is not set; and
- clearing the set of the tone-read-enable flag.

14. A method as claimed in claim 12, wherein said "tone-on-wait" function comprises the steps of:
- checking for the presence of a "tone-on-wait" state;
- checking for the presence of a "tone-off-wait" state if no "tone-on-wait" state is set;
- setting a "tone-off-increase" state if a "tone-off-wait" state is present;
- checking for the presence of a "tone-off-increase" state if no "tone-off-wait" state is set;
- counting a number of "0" upon detection of a "tone-increase" state;
- clearing the "tone-off-wait" state;
- checking if the count of "0" is greater than 10;
- determining the tone-type to be a silence tone if the count of the number of "0" is greater than 10;
- determining the tone-type by a number of "1" counted if the "tone-on-increase" state is not set; and
- clearing the tone-read-enable flag.

* * * * *

UNITED STATES PATENT AND TRADEMARK OFFICE
CERTIFICATE OF CORRECTION

PATENT NO. : 5,063,593
DATED : November 5, 1991
INVENTOR(S) : Oh-Seol Kwon

It is certified that error appears in the above-indentified patent and that said Letters Patent is hereby corrected as shown below:

Column 2

Line 58 and 59,     change "100 m seconds" to --one hundred milli-seconds;

Column 3

Line 1,     change "100 m seconds" to --one hundred milli-seconds;

Line 14,     preceding "on", insert --the--;

Column 4

Line 6,     change "100 m seconds" to --one hundred milliseconds--:

UNITED STATES PATENT AND TRADEMARK OFFICE
CERTIFICATE OF CORRECTION

PATENT NO. : 5,063,593
DATED : November 5, 1991
INVENTOR(S) : Oh-Seol Kwon

It is certified that error appears in the above-indentified patent and that said Letters Patent is hereby corrected as shown below:

Column 5, line 31, claim 9, after "interface", change "beong" to --being --.

Signed and Sealed this

Twenty-first Day of November, 1995

Attest:

BRUCE LEHMAN

Attesting Officer

Commissioner of Patents and Trademarks